(12) United States Patent
Oko et al.

(10) Patent No.: US 6,284,399 B1
(45) Date of Patent: Sep. 4, 2001

(54) FUEL CELL SYSTEM HAVING HUMIDIFICATION MEMBRANES

(75) Inventors: Uriel M. Oko, Glenmont; James H. Kralick, Albany, both of NY (US)

(73) Assignee: Plug Power LLC, Latham, NY (US)

( * ) Notice: Subject to any disclaimer, the term of this patent is extended or adjusted under 35 U.S.C. 154(b) by 0 days.

(21) Appl. No.: 09/397,830

(22) Filed: Sep. 17, 1999

(51) Int. Cl.[7] .................................................. H01M 8/18
(52) U.S. Cl. .................................. 429/19; 429/17; 429/13
(58) Field of Search .................................. 429/19, 17, 13, 429/30, 12, 49; 180/65.3

(56) References Cited

U.S. PATENT DOCUMENTS

| | | |
|---|---|---|
| 4,530,886 | 7/1985 | Sederquist . |
| 4,973,530 | 11/1990 | Vanderborgh et al. . |
| 5,260,143 | 11/1993 | Voss et al. . |
| 5,382,478 | 1/1995 | Chow et al. . |
| 5,432,020 | 7/1995 | Fleck . |
| 5,441,819 | 8/1995 | Voss et al. . |
| 5,543,238 | 8/1996 | Strasser . |
| 5,547,776 | 8/1996 | Fletcher et al. . |
| 5,786,104 | * 7/1998 | Black et al. ............................ 429/13 |
| 5,824,199 | * 10/1998 | Simmons et al. ..................... 204/262 |
| 6,007,931 | 12/1999 | Fuller et al. . |
| 6,013,385 | 1/2000 | DuBose . |

FOREIGN PATENT DOCUMENTS 2139110   5/1987  (GB) .

* cited by examiner

Primary Examiner—Gabrielle Brouillette
Assistant Examiner—Raymond Alejandro
(74) Attorney, Agent, or Firm—Fish & Richardson P.C.

(57) ABSTRACT

The invention relates to a fuel cell system having membranes that are used to humidify reactant gases. The membranes effectively prevent contamination of the reactant gases during humidification. The membranes can be used to purify the reactant gases during humidification.

28 Claims, 5 Drawing Sheets

FUEL CELL SYSTEM HAVING HUMIDIFICATION MEMBRANES

The invention relates generally to a fuel cell system having humidification membranes.

BACKGROUND OF THE INVENTION

A fuel cell can convert chemical energy to electrical energy by promoting a chemical reaction between two reactant gases.

One type of fuel cell includes a cathode flow field plate, an anode flow field plate, a membrane electrode assembly disposed between the cathode flow field plate and the anode flow field plate, and two gas diffusion layers disposed between the cathode flow field plate and the anode flow field plate. A fuel cell can also include one or more coolant flow field plates disposed adjacent the exterior of the anode flow field plate and/or the exterior of the cathode flow field plate.

Each flow field plate has an inlet region, an outlet region and open-faced channels connecting the inlet region to the outlet region and providing a way for distributing the reactant gases to the membrane electrode assembly.

The membrane electrode assembly usually includes a solid electrolyte (e.g., a proton exchange membrane) between a first catalyst and a second catalyst. One gas diffusion layer is between the first catalyst and the anode flow field plate, and the other gas diffusion layer is between the second catalyst and the cathode flow field plate.

During operation of the fuel cell, one of the reactant gases (the anode reactant gas) enters the anode flow field plate at the inlet region of the anode flow field plate and flows through the channels of the anode flow field plate toward the outlet region of the anode flow field plate. The other reactant gas (the cathode reactant gas) enters the cathode flow field plate at the inlet region of the cathode flow field plate and flows through the channels of the cathode flow field plate toward the cathode flow field plate outlet region.

As the anode reactant gas flows through the channels of the anode flow field plate, the anode reactant gas passes through the anode gas diffusion layer and interacts with the anode catalyst. Similarly, as the cathode reactant gas flows through the channels of the cathode flow field plate, the cathode reactant gas passes through the cathode gas diffusion layer and interacts with the cathode catalyst.

The anode catalyst interacts with the anode reactant gas to catalyze the conversion of the anode reactant gas to reaction intermediates. The reaction intermediates include ions and electrons. The cathode catalyst interacts with the cathode reactant gas and the reaction intermediates to catalyze the conversion of the cathode reactant gas to the chemical product of the fuel cell reaction.

The chemical product of the fuel cell reaction flows through a gas diffusion layer to the channels of a flow field plate (e.g., the cathode flow field plate). The chemical product then flows along the channels of the flow field plate toward the outlet region of the flow field plate.

The electrolyte provides a barrier to the flow of the electrons and reactant gases from one side of the membrane electrode assembly to the other side of the membrane electrode assembly. However, the electrolyte allows ionic reaction intermediates to flow from the anode side of the membrane electrode assembly to the cathode side of the membrane electrode assembly.

Therefore, the ionic reaction intermediates can flow from the anode side of the membrane electrode assembly to the cathode side of the membrane electrode assembly without exiting the fuel cell. In contrast, the electrons flow from the anode side of the membrane electrode assembly to the cathode side of the membrane electrode assembly by electrically connecting an external load between the anode flow field plate and the cathode flow field plate. The external load allows the electrons to flow from the anode side of the membrane electrode assembly, through the anode flow field plate, through the load and to the cathode flow field plate.

Because electrons are formed at the anode side of the membrane electrode assembly, that means the anode reactant gas undergoes oxidation during the fuel cell reaction. Because electrons are consumed at the cathode side of the membrane electrode assembly, that means the cathode reactant gas undergoes reduction during the fuel cell reaction.

For example, when molecular hydrogen and molecular oxygen are the reactant gases used in a fuel cell, the molecular hydrogen flows through the anode flow field plate and undergoes oxidation. The molecular oxygen flows through the cathode flow field plate and undergoes reduction. The specific reactions that occur in the fuel cell are represented in equations 1–3.

$$H_2 \rightarrow 2H^+ + 2e^- \qquad (1)$$

$$\tfrac{1}{2}O_2 + 2H^+ + 2e^- \rightarrow H_2O \qquad (2)$$

$$H_2 + \tfrac{1}{2}O_2 \rightarrow H_2O \qquad (3)$$

As shown in equation 1, the molecular hydrogen forms protons ($H^+$) and electrons. The protons flow through the electrolyte to the cathode side of the membrane electrode assembly, and the electrons flow from the anode side of the membrane electrode assembly to the cathode side of the membrane electrode assembly through the external load. As shown in equation 2, the electrons and protons react with the molecular oxygen to form water. Equation 3 shows the overall fuel cell reaction.

In addition to forming chemical products, the fuel cell reaction produces heat. One or more coolant flow field plates are typically used to conduct the heat away from the fuel cell and prevent it from overheating.

Each coolant flow field plate has an inlet region, an outlet region and channels that provide fluid communication between the coolant flow field plate inlet region and the coolant flow field plate outlet region. A coolant (e.g., liquid de-ionized water) at a relatively low temperature enters the coolant flow field plate at the inlet region, flows through the channels of the coolant flow field plate toward the outlet region of the coolant flow field plate, and exits the coolant flow field plate at the outlet region of the coolant flow field plate. As the coolant flows through the channels of the coolant flow field plate, the coolant absorbs heat formed in the fuel cell. When the coolant exits the coolant flow field plate, the heat absorbed by the coolant is removed from the fuel cell.

To increase the electrical energy available, a plurality of fuel cells can be arranged in series to form a fuel cell stack. Typically, in a fuel cell stack, one side of a flow field plate functions as the anode flow field plate for one fuel cell while the opposite side of the flow field plate functions as the cathode flow field plate in another fuel cell. This arrangement of anode/cathode flow field plates is repeated to provide the flow field plates of the fuel cell stack.

SUMMARY OF THE INVENTION

The invention relates generally to a fuel cell system having humidification membranes. In one aspect, the invention relates to humidifying fuel cell streams and to fuel cell contamination, such as, for example, that can occur along a gas diffusion layer or a membrane electrode assembly.

The invention involves the recognition that the water being used (e.g., de-ionized water and/or water passed through a reverse osmosis membrane) to humidify the reactant gas streams contained contaminants that could enter the reactant gas stream and contaminate portions of the interior of the fuel cell, such as the gas diffusion layers and the membrane electrode assembly.

In general, the invention features a system designed to humidify a reactant gas stream with reduced contamination the reactant gas stream relative to prior art systems for reactant gas stream humidification. The system can use one or more preparation membranes to achieve humidification with reduced contamination. As used herein "preparation membrane" refers to a membrane which, when a gas stream (e.g., an oxidant gas stream or a fuel gas stream) flows along one surface of the membrane and a humidifying liquid stream (e.g., a liquid water stream) flows along the opposite surface of the membrane, allows liquid water in the humidifying liquid stream to transport (e.g., wick and/or diffuse) therethrough to humidify the gas stream. One example of a preparation membrane is a reverse osmosis membrane. Another example of a preparation membrane is a dialysis membrane. The preparation membrane can be internal or external to the fuel cell.

As a preparation membrane allows liquid water to transport therethrough, the membrane effectively blocks contaminants in the humidification liquid stream from entering the gas stream (e.g., at least about 90% of the contaminants contained in the humidification liquid stream). The contaminants can include contaminants formed via corrosion and/or wear of components of the plumbing used to prepare the humidification liquid stream and transport the stream to the preparation membrane. The contaminants can also include microbes or microbiologically influenced corrosion. Examples of such contaminants include metal ions (e.g., calcium ions, magnesium ions, titanium ions, chromium ions, iron ions and/or nickel ions), particulates and/or hydrocarbons.

In some embodiments, the liquid water on the gas stream side of the preparation membrane can remove contaminants contained in the gas stream (e.g., at least about 65% of the contaminants contained in the gas stream). This may occur by, for example, sequestering or adsorbing the contaminants from the gas stream. Examples of the contaminants that can be removed from the gas stream include particulates, hydrocarbon vapors and mists, carbon oxide compounds, nitrogen oxide compounds and sulfur oxide compounds. In the case of an oxidant gas stream (e.g., air), such contaminants can enter the gas stream from the environment around the fuel cell system. In the case of a fuel gas (e.g., reformate), the contaminants may be the product of the reformer combustion process.

The amount of contaminants removed from the gas stream can be enhanced, for example, by adding one or more scavenging agents to the humidification liquid stream. In some embodiments, a scavenging agent can preferentially remove particular contaminants (e.g., carbon oxide compounds, nitrogen oxide compounds and/or sulfur oxide compounds) from the gas stream. Examples of such scavenging agents include bases (e.g., hydroxide salts and carbonate salts) and acids. Typically, each scavenging agent is used in relatively low concentration in the humidification liquid stream.

In certain embodiments, contaminants accumulating in the system, either in the humidification liquid stream or in the liquid water on the gas stream side of the preparation membrane, can be removed from the system. The removal can be continuous (e.g., steady state), or the removal can be done in a batch-like process. In some embodiments, a system (e.g., a blowdown system) can be implemented wherein a percentage (e.g., about 10%) of the humidification liquid is removed from the system, and the remainder of the humidification liquid is re-circulated through the system. Such a system can also be used to remove contaminants in the liquid water on the gas stream side of the preparation membrane.

It will be appreciated that the amount of contaminant removal from either the gas stream or the humidification liquid stream can depend upon the surface area of the preparation membrane, the amount of contaminants present and the temperature, velocity and pressure of the gas and humidification liquid streams. Additionally, in some embodiments, it may be desirable to configure the system with different contaminant removal capabilities (e.g., removal of from about 10% to about 50% of the contaminants in the humidification liquid stream and/or removal of from about 10% to about 50% of the contaminants in the gas stream).

In general, one aspect of the invention is a system which includes a fuel cell and a humidifier connected to the fuel cell. The humidifier includes a preparation membrane, and the fuel cell includes a cathode flow field plate having an inlet, an anode flow field plate having an inlet, and a solid electrolyte between the cathode flow field plate and the anode flow field plate. The humidifier defines a first flow path which passes over a surface of the preparation membrane and into the anode fluid flow plate inlet, and the humidifier defines a second flow path which passes over a second surface of the preparation membrane opposite the first surface of the first preparation membrane. During operation, the first flow path carries a reactant gas to the anode fluid flow plate inlet and the second flow path carries a humidifying liquid.

The system can further include a humidification liquid source (e.g., a water source) connected to the second surface of the preparation membrane along a third flow path flow path which is different than the first and second flow paths.

The system can include a second humidifier with a second membrane. The second humidifier defines a third flow path which passes over a first surface of the second preparation membrane and into the cathode fluid flow plate inlet and a fourth flow path which passes over a second surface of the second preparation membrane opposite the first surface of the second preparation membrane. During operation, the third flow path carries a second reactant gas (e.g., an oxidant gas) to the cathode fluid flow plate inlet and the fourth flow path carries a humidifying liquid (e.g., water).

In general, another aspect of the invention is a system which includes a fuel cell and a humidifier connected to the fuel cell. The humidifier includes a preparation membrane, and the fuel cell includes a cathode flow field plate having an inlet, an anode flow field plate, and a solid electrolyte between the cathode flow field plate and the anode flow field plate. The humidifier defines a first flow path which passes over a surface of the preparation membrane and into the cathode fluid flow plate inlet, and the humidifier defines a second flow path which passes over a second surface of the preparation membrane opposite the first surface of the first preparation membrane. During operation, the first flow path carries a reactant gas to the cathode fluid flow plate inlet and the second flow path carries a humidifying liquid.

In general, a further aspect of the invention is a method of operating a fuel cell which includes humidifying a reactant gas stream while effectively preventing contamination of the reactant gas stream to form a humidified reactant gas stream, and flowing the humidified reactant gas stream through the fuel cell.

The method can further include humidifying a second reactant gas stream while effectively preventing contamination of the second reactant gas stream to form a humidified second reactant gas stream, and flowing the humidified second reactant gas stream through the fuel cell.

One potential advantage of the invention is that the filtration achieved by the preparation membranes can provide humidification of reactant gases with less reactant gas contamination than achieved with certain prior art systems.

Another potential advantage of the invention is that the use of preparation membranes can increase the tolerance of the system for reactant gas streams containing contaminants relative to certain prior art systems.

A further potential advantage of the invention is that the amount of contaminants transferred to the interior of the fuel cell by the reactant gas stream is reduced relative to certain prior art systems.

An additional potential advantage of the invention is that a relatively impure humidification liquid (e.g., tap water) can be used. This can reduce the cost and complexity associated with designing and maintaining the system. For example, tap water can be less corrosive and easier to handle than certain other humidification liquids (e.g., deionized water).

Yet another potential advantage of the invention is that one or more reactant gases can be simultaneously humidified and purified.

Still another potential advantage of the invention is that a wide range of membrane and membrane configurations are known that can be adapted for the particular applications of the invention. For example, commercially available reverse osmosis membranes can be used.

An additional potential advantage of the invention is that the preparation membranes can be configured to allow periodic replacement and/or regeneration.

Other advantages and features will become apparent from the following description of the preferred embodiments and the claims.

DETAILED DESCRIPTION

In one respect, the invention relates to recognizing that humidifying a reactant gas stream (e.g., an oxidant gas stream or a fuel gas stream), for example, with steam (e.g., steam formed from de-ionized water) can result in contamination of the interior a fuel cell with various contaminants. Such contamination can reduce fuel cell performance.

Figure 1:
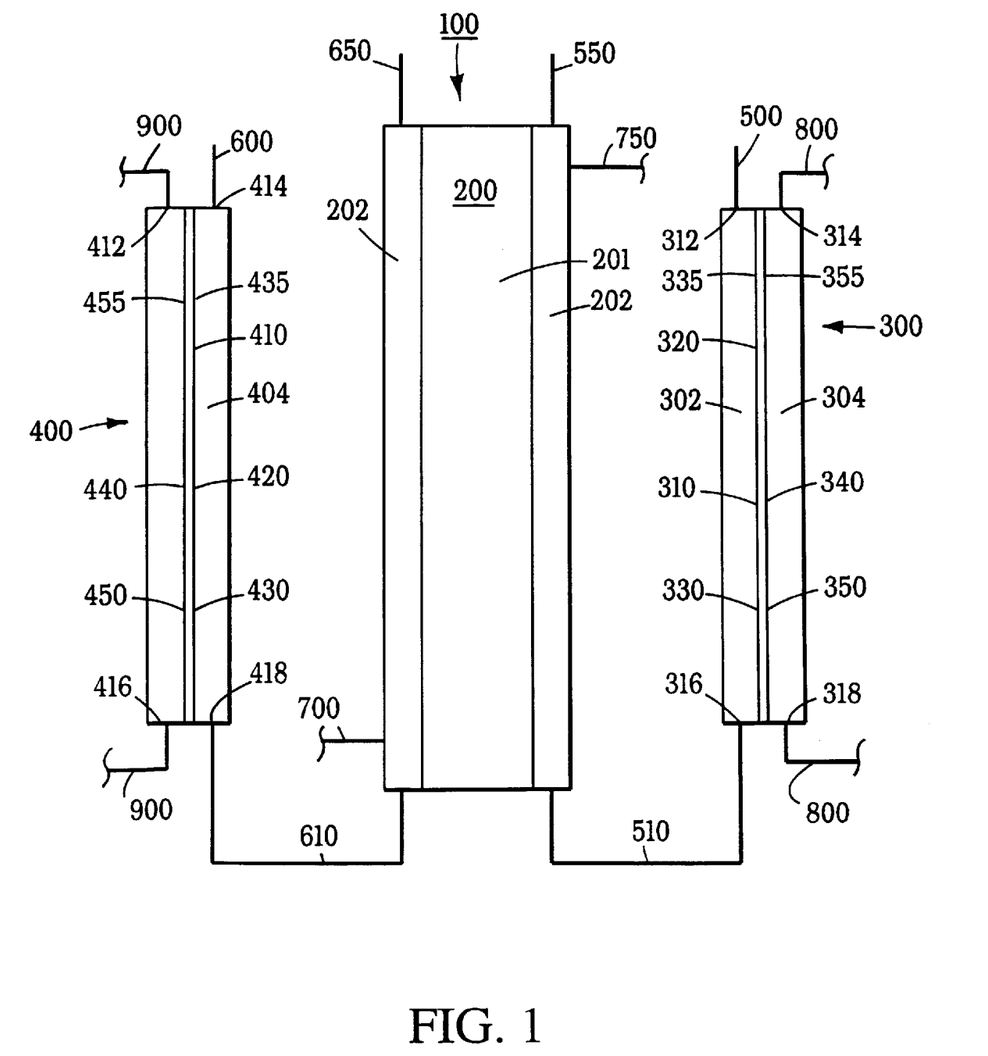
FIG. 1 is a schematic representation of a fuel cell system according to an embodiment of the invention.

FIG. 1 shows an embodiment of a fuel cell system 100 including a fuel cell stack 200 with an active area 201 and manifolds 202, a humidifier 300, a humidifier 400, a dry oxidant gas input stream 500, a humidified oxidant input stream 510, an oxidant gas output stream 550, a dry fuel gas input stream 600, a humidified fuel gas output stream 610, a fuel gas output stream 650, a coolant input stream 700, a coolant output stream 750, a humidifying liquid stream 800 and a humidifying liquid stream 900.

Humidifier 300 has volumes 302 and 304 which are in fluid communication through a preparation membrane 310. Preparation membrane 310 has inlets 312 and 314 and outlets 316 and 318. Similarly, humidifier 400 has volumes 402 and 404 in fluid communication through a preparation membrane 410. Preparation membrane 410 has inlets 412 and 414 and outlets 416 and 418. On one side, preparation membrane 310 has a surface 320 with an upstream region 330 and a downstream region 335, and, on the other side, preparation membrane 310 has a surface 340 with an upstream region 350 and a downstream region 355. Preparation membrane 410, like preparation membrane 310, has opposed surfaces 420 and 440, each with a corresponding upstream regions 430 and 450, and downstream regions 435 and 455.

During operation of fuel cell stack 200, molecular oxygen and molecular hydrogen contained in gas streams 510 and 610, respectively, flow through manifolds 202 and into fuel cell active area 201 and react to produce electricity, heat and water. The water produced during the reaction is removed from fuel cell stack 200 in gas streams 550 and 650 in the form of liquid water and water vapor. During the fuel cell reaction, a coolant contained in stream 700 flows through fuel cell stack 200, absorbs the heat generated during the fuel cell reaction, and exits fuel cell stack 200 through stream 750.

Prior to entering fuel cell stack 200, dry oxidant gas input stream 500 flows along surface 320 of preparation membrane 310 from region 330 to region 335. At the same time, humidifying liquid (e.g., liquid water) stream 800 flows along surface 340 of preparation membrane 310 from region 350 to region 355. Similarly, prior to entering fuel cell stack 200, fuel gas input stream 600 flows along surface 420 of preparation membrane 410 from region 430 to region 435. At the same time, humidifying liquid (e.g., liquid water) stream 900 flows along surface 440 of preparation membrane 410 from region 450 to region 455. It will be appreciated that the invention is not limited with respect to the location of humidifiers 300 and 400 in system 100. For example, humidifier 300 and/or humidifier 400 can be located outside fuel cell stack 200 (e.g., exterior to a fuel cell), or humidifier 300 and/or humidifier 400 can be located within fuel cell stack 200 (e.g., within a fuel cell or exterior to a fuel cell).

As dry gas streams 500 and 600 flow along surfaces 320 and 420, respectively, water contained in humidifying liquid streams 800 and 900 transports (e.g., wicks and/or diffuses) through membranes 310 and 410, respectively, to surfaces 320 and 420, respectively. The water present at surfaces 320 and 420 gasifies (e.g., evaporates) to humidify dry gas streams 500 and 600, respectively, forming humidified gas stream 510 and 610. Membranes 310 and 410 effectively block contaminants contained in humidifying liquid streams 800 and 900 so that dry gas streams 500 and 600 are humidified without substantial contamination. Typically, membranes 310 and 410 can effectively block contaminants contained in humidification streams 800 and 900 from passing therethrough.

Generally, an excess of liquid water transports through membranes 310 and 410 so that the surfaces 320 and 420, respectively, are substantially wetted with liquid water. As dry gas streams 500 and 600 flow along surfaces 320 and 420, respectively, contaminants contained in dry gas streams 500 and 600 can be adsorbed and/or sequestered by water on surfaces 320 and 420, respectively, thereby purifying streams 500 and 600 so that humidified gas streams 510 and 610 have a relatively low concentration of these contaminants.

In certain embodiments, one or more scavenging agents that combine with contaminants can be disposed in (e.g., dissolved in) humidifying liquid streams 800 and 900 so that the excess liquid water on surfaces 320 and 420 contains the additives. As dry gas streams 500 and 600 flow along surfaces 320 and 420, respectively, the scavenging agent-containing liquid water can purify gas streams 500 and 600 by combining with contaminants from gas streams 500 and 600. For example, a basic additive (e.g., a hydroxide salt or a carbonate salt) or an acidic additive (e.g., sulfuric acid) can be added to humidifying liquid streams 800 and 900. As gas streams 500 and 600 flow along surfaces 320 and 420, respectively, the basic or acidic additive(s) contained in the water at surfaces 320 and 420, respectively, can combine with nitrogen oxide compounds and sulfur oxide compounds from gas streams 500 and 600, respectively.

In one embodiment, humidifying liquid streams 800 and 900 can be operated at a higher pressure than streams 500 and 600. For example, in a near-atmospheric system, reactant streams 500 and 600 can be operated within about 10% of atmospheric pressure, and humidification liquid streams 800 and 900 can be operated at, for example, about twice that pressure. As another example, in pressurized systems, streams 500 and 600 may be operated at about twice atmospheric pressure so that the pressure of streams 500 and 600 is about twice the pressure of streams 800 and 900. In a further example, the pressure of streams 500 and 600 is within about 15% of the pressure of streams 800 and 900.

In some systems, it may be desirable to operate streams 800 and 900 at elevated temperatures, such as about 180° C. at introduction to humidifiers 300 and 400, respectively, and 120° C. when exiting humidifiers 300 and 400 respectively. This may be done, for example, to promote diffusion and subsequent evaporation of the humidifying liquid.

Examples of preparation membranes include reverse osmosis membranes, such as those commercially available from Giner, Inc., Osmonics, Vaponics, Applied Membranes, Inc., Hydranautics, Ropur AG and Culligans. In one embodiment, the preparation membrane is a NAFION-type membrane adapted for reverse osmosis applications, such as available from Giner, Inc.

Although certain embodiments of preparation membranes have been described herein, the invention is not limited to such preparation membranes. In some embodiments, a humidifier may contain two preparation membranes disposed adjacent each other with a humidification liquid flowing therebetween and a reactant gas flowing along the outer surfaces of each membrane. In certain embodiments, as known to those skilled in the art, a preparation membrane can be arranged to have a reactant gas flowing along two surfaces while the gas is being humidified and/or decontaminated.

Moreover, as known to those skilled in the art, a preparation membrane can have a variety of physical constructions. For example, in some embodiments, it may be desirable to increase the surface area of a preparation membrane without also substantially increasing the volume occupied by the preparation membrane. In these embodiments, a spiral wound membrane (e.g., a spiral wound reverse osmosis membrane or a spiral wound dialysis membrane) can be used. The layers in a spiral wound membrane can be spaced with corrugated spacers. In certain embodiments, a preparation membrane can be a hollow tube or a bag. Other physical configurations of preparation membranes can also be used.

Figure 2:
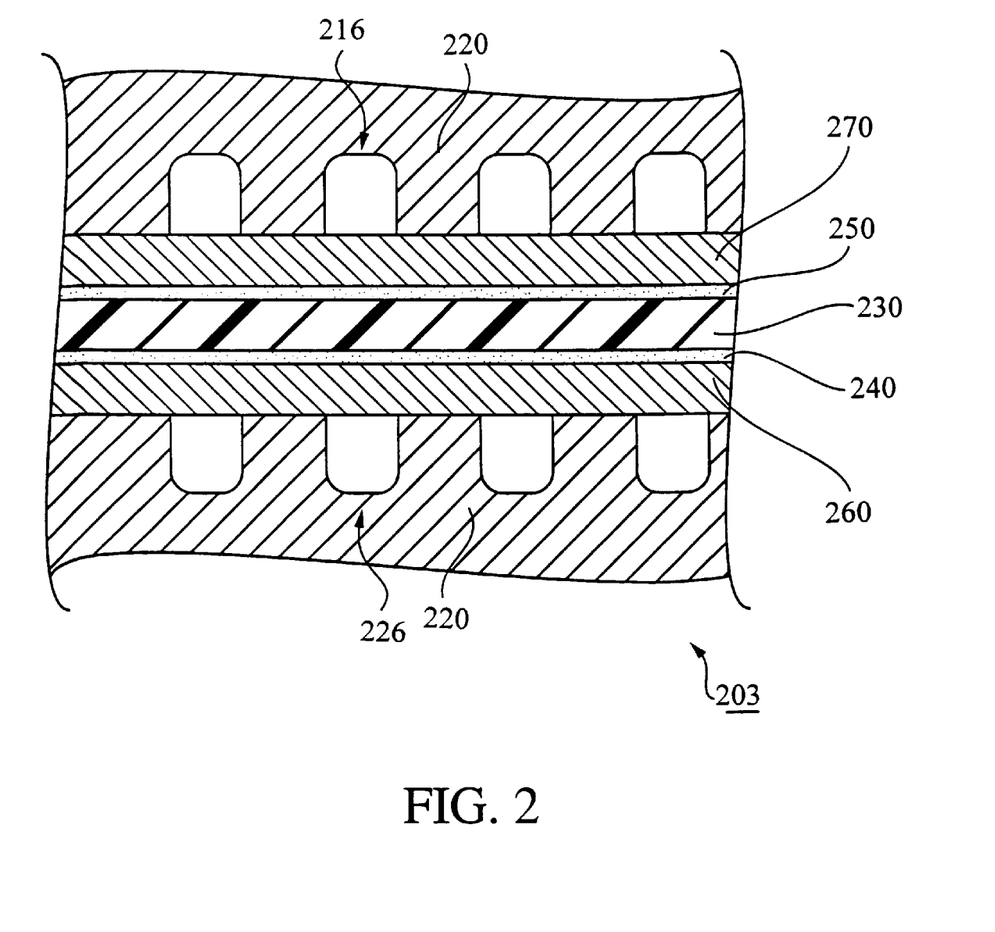
FIG. 2 is a cross-sectional view of a fuel cell according to an embodiment of the invention.

FIG. 2 shows an embodiment of fuel cell 203 designed to catalyze the fuel cell reaction. Fuel cell 203 includes a cathode flow field plate 210, an anode flow field plate 220, a solid electrolyte 230, catalysts 240 and 250 and gas diffusion layers 260 and 270.

Electrolyte 230 should be capable of allowing ions to flow therethrough while providing a substantial resistance to the flow of electrons. Electrolyte 230 is a solid polymer (e.g., a solid polymer ion exchange membrane), such as a solid polymer proton exchange membrane (e.g., a solid polymer containing sulfonic acid groups). Such membranes are commercially available from E.I. DuPont de Nemours Company (Wilmington, Del.) under the trademark NAFION. Alternatively, electrolyte 230 can also be prepared from the commercial product GORE-SELECT, available from W.L. Gore & Associates (Elkton, Md.).

Catalyst 240 can be formed of a material capable of interacting with molecular hydrogen to form protons and electrons. Examples of such materials include, for example, platinum, platinum alloys, and platinum dispersed on carbon black. The catalytic material can be dispersed in one or more solvents (e.g., isopropanol) to form a suspension. The suspension is then applied to the surfaces of solid electrolyte 230 that face gas diffusion layers 260 and 270, and the suspension is then dried. Alternatively, the suspension is applied to the surfaces of gas diffusion layers 260 and 270 that face catalysts 240 and 250, respectively, and the suspension is then dried. The method of preparing catalyst 240 may further include the use of heat and temperature to achieve bonding.

Catalyst 250 can be formed of a material capable of interacting with molecular oxygen, electrons and protons to form water. Examples of such materials include, for example, platinum, platinum alloys, and noble metals dispersed on carbon black. Catalyst 250 can be prepared as described above with respect to catalyst 240.

Gas diffusion layers 260 and 270 are formed of a material that is both gas and liquid permeable material so that the reactant gases (e.g., molecular hydrogen and molecular oxygen) and products (e.g., water) can pass therethrough. In addition, layers 260 and 270 should be electrically conductive so that electrons can flow from catalysts 240 and 250 to flow field plates 220 and 210, respectively. Such materials may be further treated, for example, by infusing them with TEFLON to improve hydrophobicity.

Figure 3:
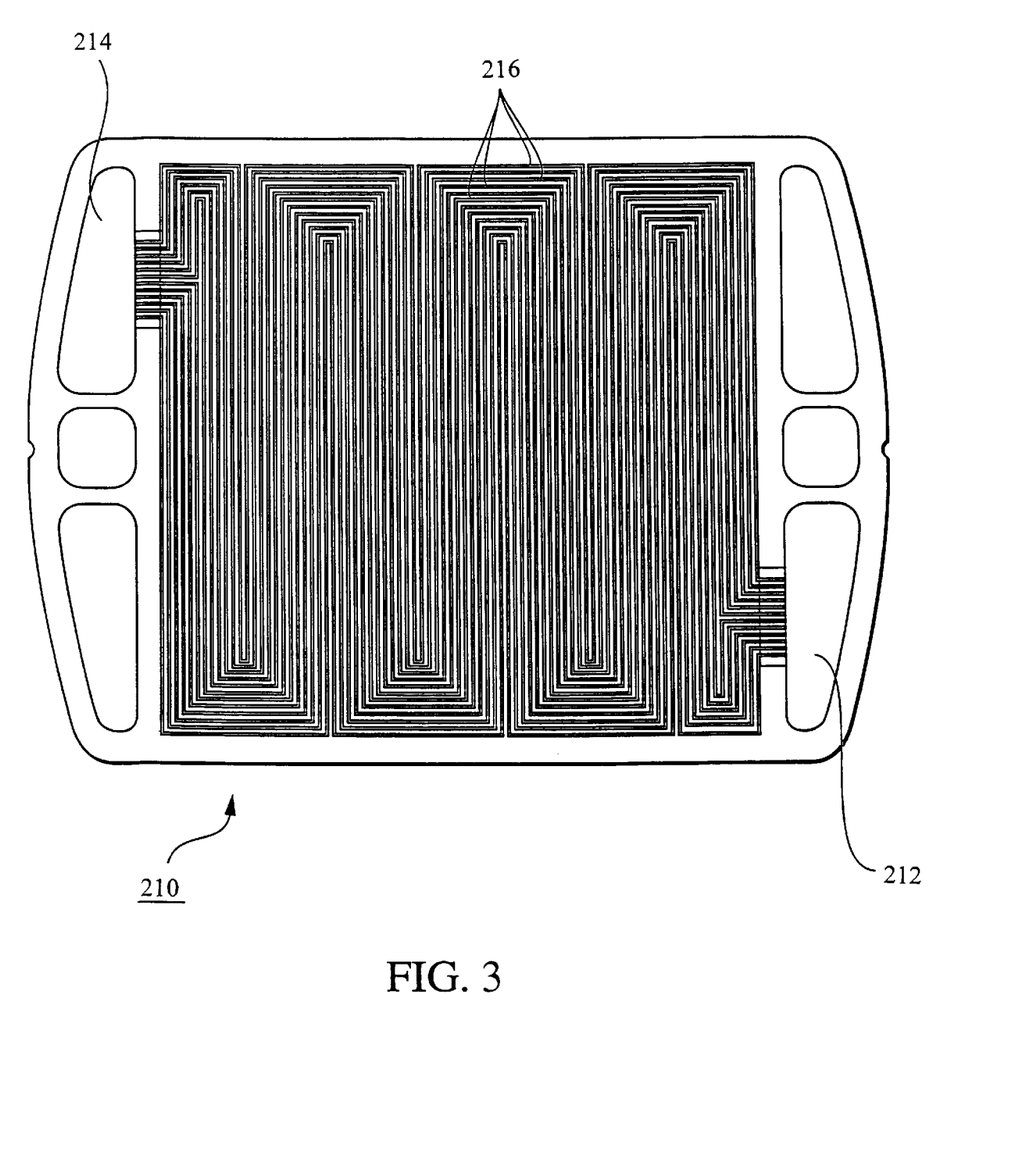
FIG. 3 is an elevational view of a cathode flow field plate according to an embodiment of the invention.

FIG. 3 shows an embodiment of cathode flow field plate 210 which is used to provide a flow path that allows the molecular oxygen to interact with catalyst 250. Cathode 210 has an inlet 212, an outlet 214 and open-faced channels 216 that define a flow path for an oxidant gas from inlet 212 to outlet 214. Inlet 212 is in fluid communication with manifold 202 so that, after flowing along surface 320 of preparation membrane 310, oxidant gas input stream 500 flows to inlet 212. As the oxidant gas flows along channels 216, the molecular oxygen contained in the oxidant gas permeates gas diffusion layer 270 to interact with catalyst 250, electrons and protons to form water. The water can pass back through diffusion layer 270, enter the oxidant stream in channels 216, flow to outlet 214 and exit fuel cell 203.

Figure 4:
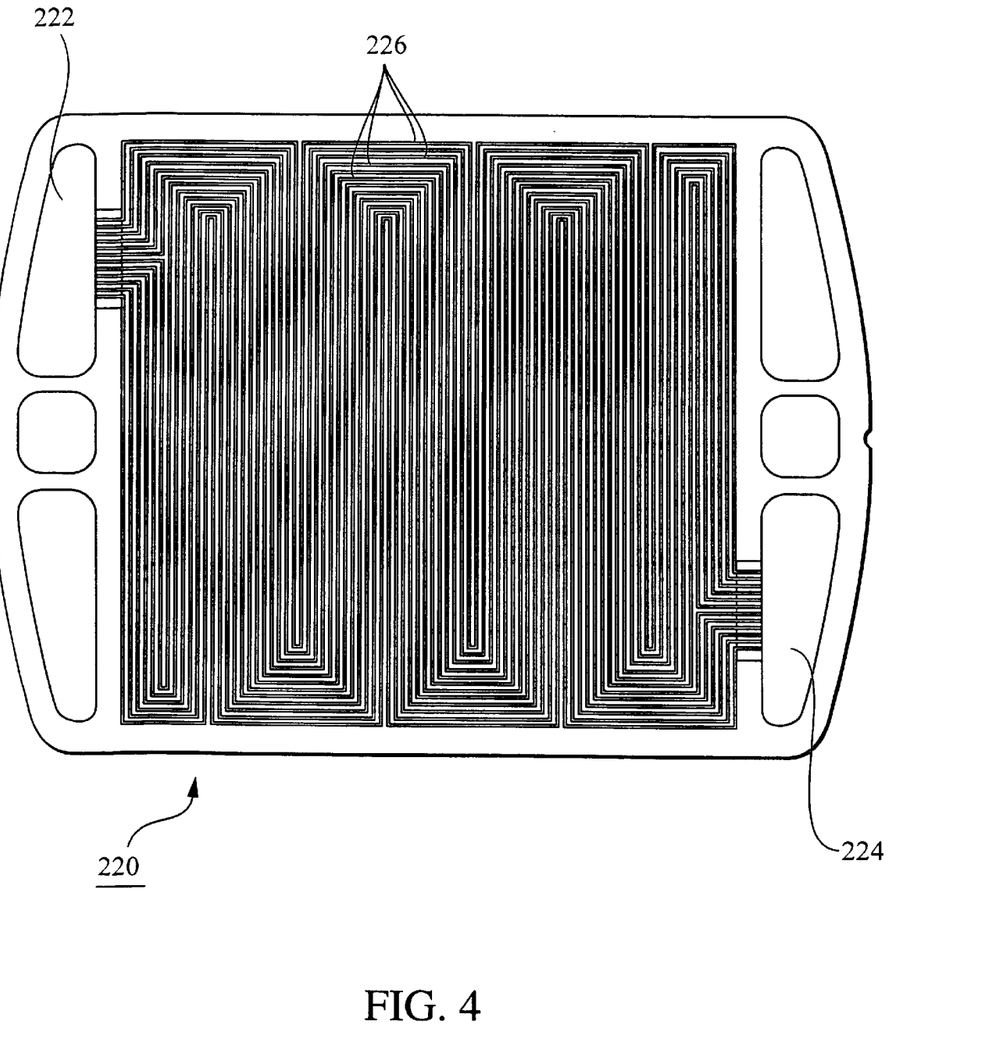
FIG. 4 is an elevational view of an anode flow field plate according to an embodiment of the invention.

FIG. 4 shows an embodiment of anode flow field plate 220 which is designed to provide a flow path for a fuel gas that allows the molecular hydrogen to interact with catalyst 24. Cathode flow field plate 220 has an inlet 222, outlet 224 and open-faced channels 226 that define a flow path for a fuel gas from inlet 222 to outlet 224. Inlet 222 is in fluid communication with manifold 202 so that, after flowing along surface 420 of preparation membrane 410, fuel gas input stream 600 flows to inlet 222. As the fuel flows along channels 216, the molecular hydrogen contained in the fuel gas permeates gas diffusion layer 260 to interact with catalyst 240 to form protons and electrons. The protons pass through solid electrolyte 230, and the electrons pass are conducted through gas diffusion layer 260 to anode flow field plate 220, ultimately flowing through an external load to cathode flow field plate 210.

Figure 5:
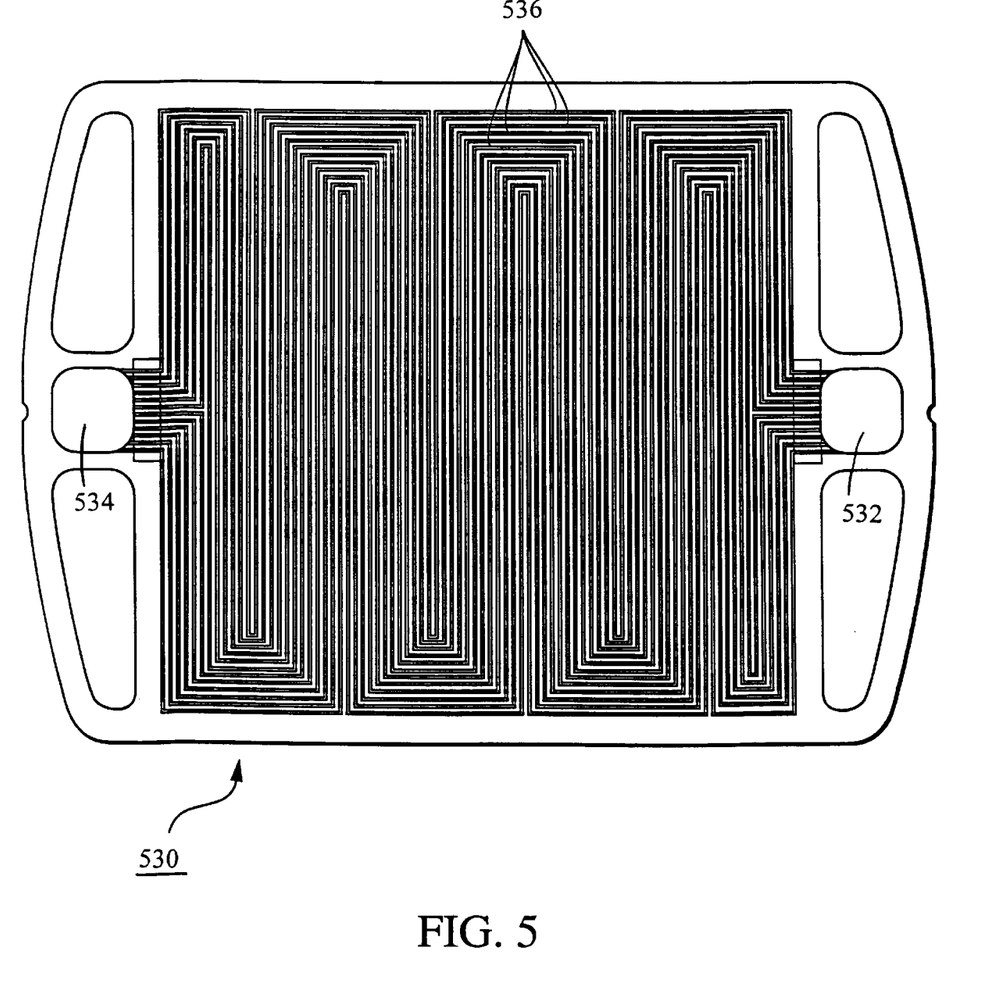
FIG. 5 is an elevational view of a coolant flow field plate according to an embodiment of the invention.

The heat produced during the fuel cell reaction is removed from fuel cell stack 200 by flowing a coolant through the fuel cell via a coolant flow field plate. FIG. 5 shows an embodiment of coolant flow field plate 530 having an inlet 532, an outlet 534 and open-faced channels 536 that define a flow path for coolant from inlet 532 to outlet 534. The coolant enters fuel cell 203 via inlet 532, flows along channels 536 and absorbs heat, and exits fuel cell 203 via outlet 534.

Although certain embodiments and arrangements of cathode flow field plate 210, anode flow field plate 220 and coolant flow field plate 530 have been described herein, other embodiments and arrangements of these flow field plates can also be used. For example, other embodiments are disclosed in commonly assigned U.S. patent application Ser. No. 09/168,232, entitled "Fuel Cell Assembly Unit for Promoting Fluid Service and Design Flexibility", which is hereby incorporated by reference.

Moreover, while the previous discussion has generally referred to a single fuel cell, the fuel cell system is not limited to such single cell embodiments. Rather, the fuel cell system can include a plurality of fuel cells as in the case of a fuel cell stack. Typically, the fuel cells in such systems are arranged in series by having the back surface of a cathode flow field plate in one fuel cell serve as the anode flow field plate in the next fuel cell in the series arrangement. A plurality of coolant flow field plates can also be used in these systems. Examples of fuel cell systems having a plurality of fuel cells and coolant flow field plates are described in U.S. patent application Ser. No. 09/168,232.

While certain embodiments of the invention, as well as their principals of operation, have been disclosed herein, the invention is not limited to these embodiments or these principals of operation. Other embodiments are in the claims.

What is claimed is:

1. A method of operating a fuel cell, comprising:
   humidifying a reactant gas stream with a humidifying liquid stream while blocking at least about 90% of the contaminants contained in the humidifying liquid stream from entering the reactant gas stream to form a humidified reactant gas stream; and
   flowing the humidified reactant gas stream through the fuel cell.

2. The method of claim 1, wherein the reactant gas stream is humidified by transporting water through a membrane.

3. The method of claim 2, wherein the membrane prevents contaminants in the water from passing into the reactant gas stream.

4. The method of claim 3, wherein the contaminants comprise metal ions.

5. The method of claim 3, wherein the reactant stream is humidified by a humidification liquid stream and the contaminants are generated during formation and transport of the humidification stream to the membrane.

6. The method of claim 5, wherein a pressure of the reactant gas stream is less than about 60% of a pressure of the humidification liquid stream.

7. The method of claim 6, wherein a pressure of the reactant gas stream is within about 15% of a pressure of the humidification liquid stream.

8. The method of claim 1, wherein contaminants are removed from the reactant gas stream during humidification of the reactant gas stream.

9. The method of claim 8, wherein the contaminants comprise nitrogen oxide compounds and sulfur oxide compounds.

10. The method of claim 1, further comprising:
    humidifying a second reactant gas stream with a humidifying liquid stream while blocking at least about 90% of the contaminants contained in the humidifying liquid stream from entering the second reactant gas stream to form a humidified second reactant gas stream; and
    flowing the humidified second reactant gas stream through the fuel cell.

11. The method of claim 10, wherein the second reactant gas comprises an oxidant gas.

12. The method of claim 11, wherein the first reactant gas comprises a fuel gas.

13. The method of claim 1, wherein the reactant gas stream is humidified using a preparation membrane.

14. The method of claim 13, wherein the preparation membrane comprises a reverse osmosis membrane.

15. The method of claim 13, wherein the preparation membrane comprises a dialysis membrane.

16. The method of claim 2, wherein the membrane comprises a preparation membrane.

17. The method of claim 3, wherein the reactant gas stream is humidified using a preparation membrane.

18. The method of claim 4, wherein the reactant gas stream is humidified using a preparation membrane.

19. The method of claim 5, wherein the reactant gas stream is humidified using a preparation membrane.

20. The method of claim 6, wherein the reactant gas stream is humidified using a preparation membrane.

21. The method of claim 7, wherein the reactant gas stream is humidified using a preparation membrane.

22. The method of claim 8, wherein the reactant gas stream is humidified using a preparation membrane.

23. The method of claim 9, wherein the reactant gas stream is humidified using a preparation membrane.

24. The method of claim 10, wherein the reactant gas stream is humidified using a preparation membrane.

25. The method of claim 24, wherein the preparation membrane comprises a reverse osmosis membrane.

26. The method of claim 24, wherein the preparation membrane comprises a dialysis membrane.

27. The method of claim 11, wherein the reactant gas stream is humidified using a preparation membrane.

28. The method of claim 12, wherein the reactant gas stream is humidified using a preparation membrane.

* * * * *